Nov. 11, 1947.     W. H. SCOTT     2,430,739
TRAP CLEANER
Filed July 16, 1945
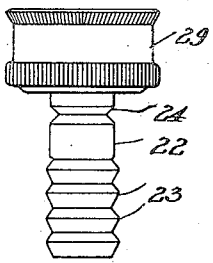
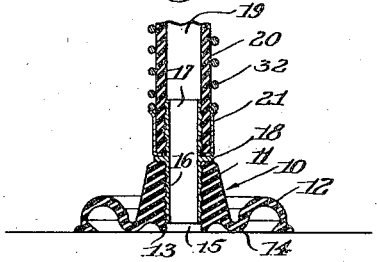
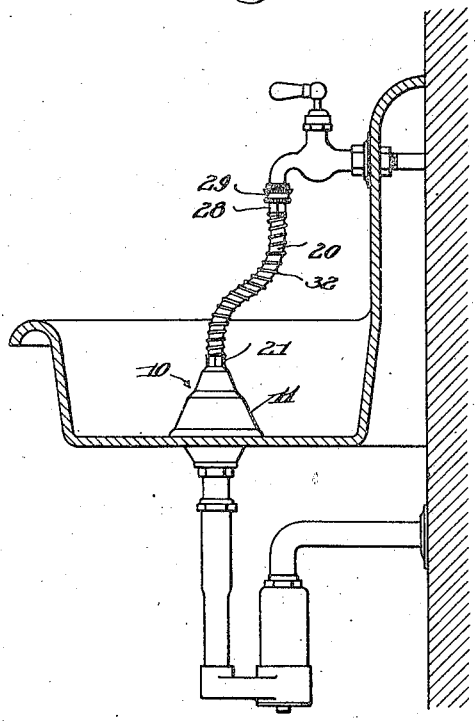
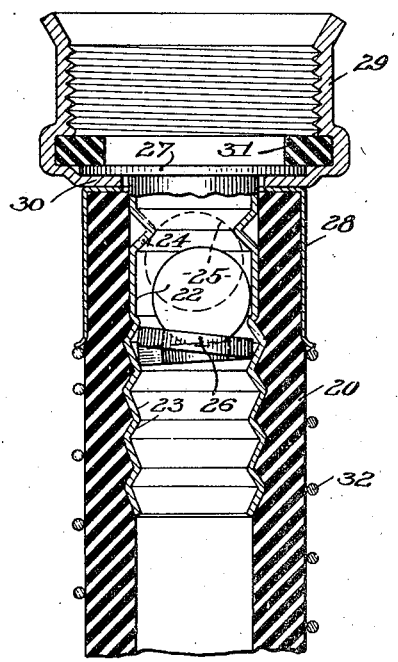
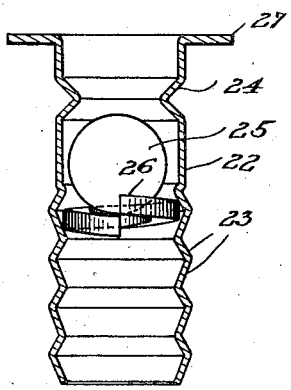
INVENTOR.
William H. Scott
BY Edward H. Cumpston
his Attorney Patented Nov. 11, 1947

2,430,739

UNITED STATES PATENT OFFICE 2,430,739

TRAP CLEANER

William H. Scott, Rochester, N. Y.

Application July 16, 1945, Serial No. 605,312

3 Claims. (Cl. 4—256)

This invention relates to trap cleaners of the type comprising a cup of rubber, or other resilient material, for application to a trap opening to be cleaned and having a connected rubber tube for attachment to a faucet for applying service line water pressure to the trap opening, to clear the same of obstructions. It is possible that during the use of such a device, contaminated water may be sucked up into it from the trap connection, or a suction may be created in the service line to the faucet, with a similar effect, tending in either case to introduce contaminated water into the service line. One object of the present invention is to provide an improved and more sanitary trap cleaner of the above character provided with means for preventing contamination of the faucet or service line.

Another object is to provide a more sanitary trap cleaner of the above nature having a simple, practical and reliable type of construction capable of being manufactured at a comparatively low cost.

To these and other ends the invention resides in certain improvements and combinations of parts, all as will be hereinafter more fully described, the novel features being pointed out in the claims at the end of the specification.

In the drawings:

Fig. 1 is an elevation, partly in section, showing a device embodying the present invention as applied in use;

Fig. 2 is an enlarged, sectional view of a portion of the device showing the sanitary valve feature and the means for connecting the device to the faucet;

Fig. 3 shows nipple and valve means forming part of Fig. 2, but detached therefrom;

Fig. 4 is a reduced elevation of parts shown in Fig. 2; and

Fig. 5 is a sectional elevation of cup means forming part of Fig. 1, but applied in a different position to the trap to be cleaned.

The invention is embodied in the present instance in a trap cleaner comprising a suction cup of rubber, or rubber-like resilient material, indicated generally at 10, having a hollow, conical and substantially rigid shank portion 11 (Fig. 5) and an outwardly flaring, flexible skirt portion 12. The bottom of the shank portion is formed inside the cup with a rib 13 and the skirt portion with a rib 14, for a purpose hereafter described.

Anchored in the bore 15 of the cup shank 11, as by means of ridges or corrugations 16, is a tubular connector 17 formed at its center with an outwardly extending flange 18 resting on the upper end of the cup shank. The other end of the connector is similarly anchored in the opening 19 of a flexible tube 20 of rubber, or rubber-like material, provided at its end with a protecting metal ferrule 21. Tube 20 is of sufficient length to enable the cup 10 to be applied to the trap opening of a kitchen or lavatory sink and to be connected at its other end with the faucet over the sink, for transmitting the supply line pressure from the faucet to the trap.

I have devised, in combination with such a trap cleaner, a sanitary and efficient construction for connecting the upper end of the tube 20 with a faucet and comprising an automatic, pressure-responsive valve for preventing the flow of water from the trap to the faucet. This construction comprises a tubular nipple 22 (Figs. 2 and 3) inserted in the end of the tube and anchored therein, as by means of a series of circumferential corrugations 23, preferably spun in the nipple walls adjacent one end thereof, as shown. At a point spaced above such corrugations, the nipple is provided with a valve seat, preferably in the form of an inwardly extending ridge or contraction 24 spun in the metal. Cooperating with the seat 24 is a ball valve 25 somewhat smaller in diameter than the tube, so as to move freely to and from the seat 24. To limit the movement of the valve away from the seat, a split spring washer 26 is lodged in the nipple against the shoulder formed by the upper corrugation 23 thereof, the relatively offset ends of the washer serving to prevent the ball from seating in the washer opening, so as to maintain the tube open for the flow of water from the nozzle to the cup. In case the pressure at the nozzle should fall below the pressure in the cup, however, or in case of flow of water from the cup toward the nozzle, the valve 25 is immediately moved against the seat 24 so as to close and seal the tube.

The upper end of nipple 22 is preferably formed with an outwardly extending flange 27, located in spaced relation with the upper end of the rubber tube 20, which may be protected by a metal ferrule 28, as shown. For connecting the tube with the faucet, an internally threaded ring or sleeve 29 is formed with an inwardly extending flange 30, rotatably positioned between the nipple flange 27 and the ferrule 28 of the tube, so that the sleeve may be rotated to screw it on the usual threaded nozzle. For use with unthreaded nozzles of either ring or oval shape, an adapter of known construction, not shown) may be employed having at one end a threaded nozzle for connection with the sleeve 29 and at its other end a flexible portion provided with a clamp for attachment to the nozzle, as well understood in the art. Sleeve 29 is preferably provided with a washer 31 to seal the connection with the faucet or adapter. In manufacturing the nipple 22, the washer 26 is first inserted and lodged against the shoulder provided by one of the corrugations 23, the ball valve is inserted above the washer and the seat 24 is then spun inwardly by tool means of known character, thus preventing subsequent dislodgement of the valve.

To reinforce the flexible tube 20, particularly in applications where the relative locations of the trap opening and faucet require sharp bending of the tube, a coiled spring 32 is preferably telescoped over the tube and retained between the ferrules 21 and 28 at its ends as shown.

In operation, the cup 10 is placed over the discharge opening leading to the trap of a kitchen or lavatory sink and the upper end of the tube 20 connected with a faucet by means of the connecting device described. A hot water faucet is preferred where available. The pressure is then turned on at the faucet and the cup 10 depressed to flex its skirt portion until its ribs 13 and 14, as well as its outer periphery, rest on the bottom of the sink, thereby forming air pockets tending to hold and seal the cup to the sink bottom. The water from the faucet, preferably in a heated condition, is thereby forced through the seat, around the valve 25, through the opening in the washer 26, and through the drain, so as to force an opening through any obstructing material accumulated therein. It has been found that such application of water under pressure to a clogged sink outlet, particularly if the water is heated, serves to quickly clear away obstructing material.

The combination of such an automatic, pressure-responsive valve with a cleaner of the type described operates to prevent any contamination of the water supply line and thus makes the cleaner entirely sanitary. By means of the present invention this sanitary valve feature is incorporated directly in the trap cleaner in a simple and practical type of construction, capable of being economically manufactured and assembled and of being used indefinitely without getting out of order.

It will thus be seen that the invention accomplishes its objects and while it has been herein disclosed by reference to the details of a particular embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A trap cleaner comprising a cup of resilient material, a flexible tube connected at one end to said cup, a device on the other end of said tube for connecting the same with a faucet, a nipple in said tube having an inwardly formed portion providing a valve seat and having circumferential corrugations for anchoring said nipple in said tube, a split spring washer retained in said nipple by said corrugations in spaced relation with said seat, and a ball valve movable between said washer and seat for closing said tube against the flow of water from said cup to said faucet.

2. A trap cleaner comprising a cup of resilient material having a hollow shank portion and a flexible skirt portion, spaced concentric ribs in said cup on said shank and skirt portions, respectively, for engagement with the surface of a sink to form an air pocket about a trap opening, a flexible tube connected at one end to said cup shank, a nipple in the other end of said tube formed with an inwardly extending seat and with circumferential corrugations for anchoring the same in said tube, a ball valve for cooperation with said seat to close said tube against the flow of water from said cup toward said faucet, a device retained in said nipple by said corrugations for limiting the movement of said valve away from said seat, an outwardly extending flange on said nipple in spaced relation with the end of said tube, and an internally threaded sleeve for connection with a faucet and having an inwardly extending flange rotatably retained between said nipple flange and the end of said tube.

3. A trap cleaner comprising a rubber cup having a shank portion and a flexible skirt portion, spaced concentric ribs on said shank and skirt portions in said cup for engagement with the surface of a sink to form an air pocket about a trap opening, a rubber tube connected at one end to said cup shank, a nipple formed with circumferential corrugations for anchoring the same in the other end of said tube, said nipple having an inwardly extending wall portion forming a seat, a ball valve for cooperation with said seat to close said tube against the flow of water from said cup to said faucet, a split spring washer retained in said nipple by said corrugations for limiting the movement of said valve away from said seat, an outwardly extending flange on the end of said nipple in spaced relation with the end of said tube, and a threaded sleeve for engagement with a faucet and having an inwardly extending flange rotatably supported between said nipple flange and the end of said tube.

WILLIAM H. SCOTT.

REFERENCES CITED

The following references are of record in the file of this patent:

UNITED STATES PATENTS

| Number | Name | Date |
| --- | --- | --- |
| 994,442 | Coles | June 6, 1911 |
| 1,925,359 | Alonso | Sept. 5, 1933 |
| 1,980,099 | Schacht | Nov. 6, 1934 |
| 2,312,826 | Leyden | Mar. 2, 1943 |